Patented Oct. 2, 1951

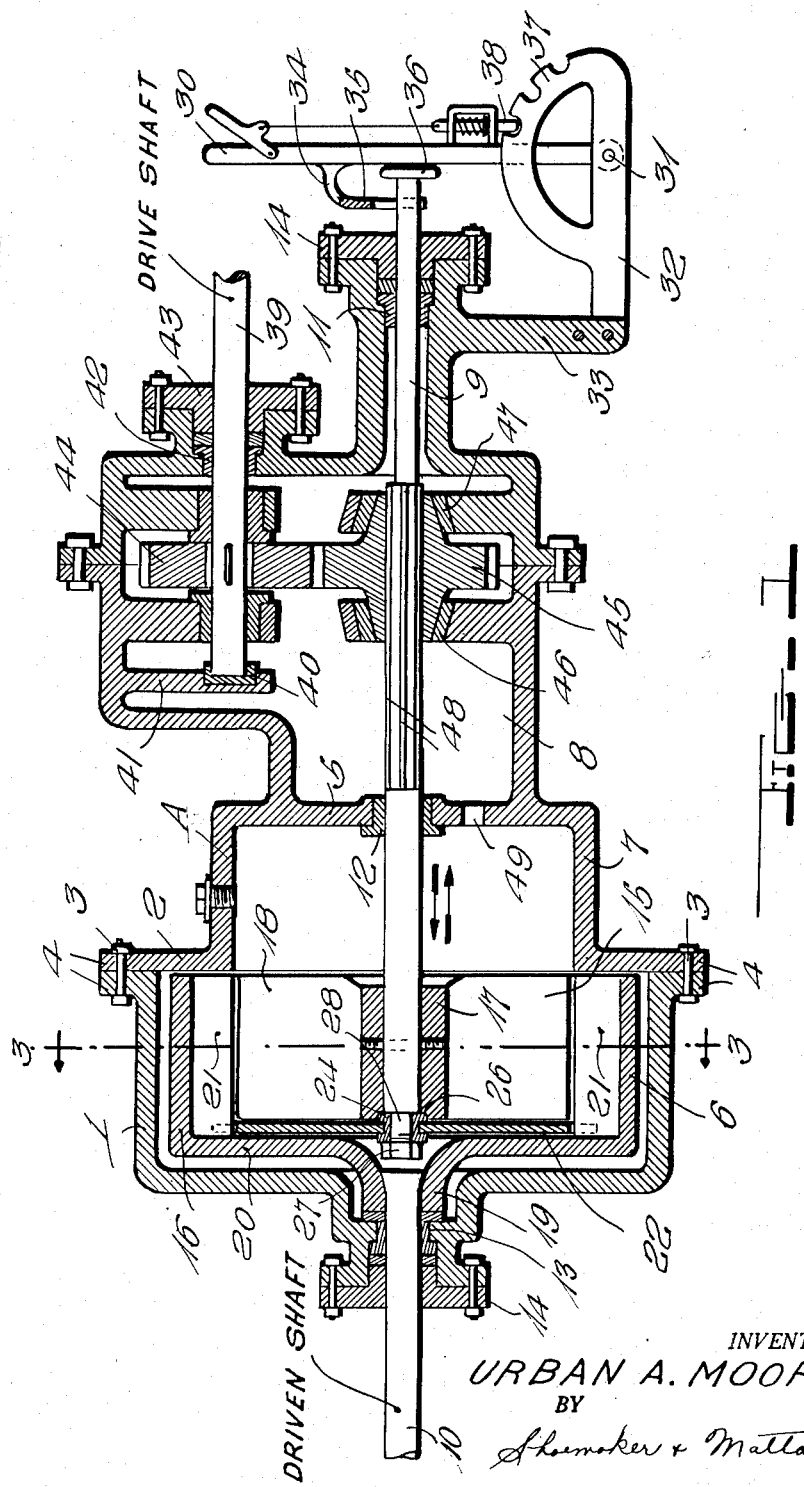

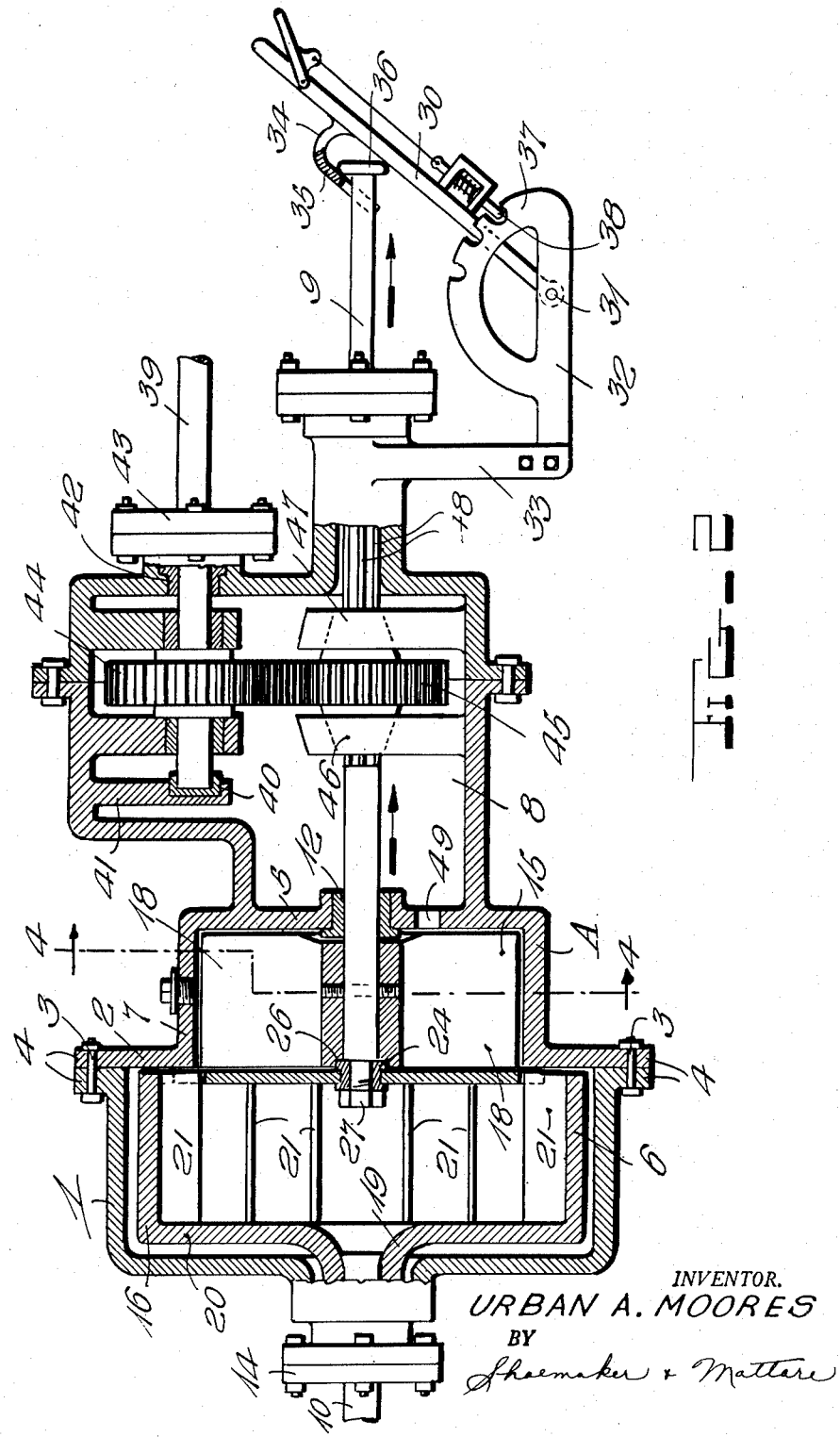

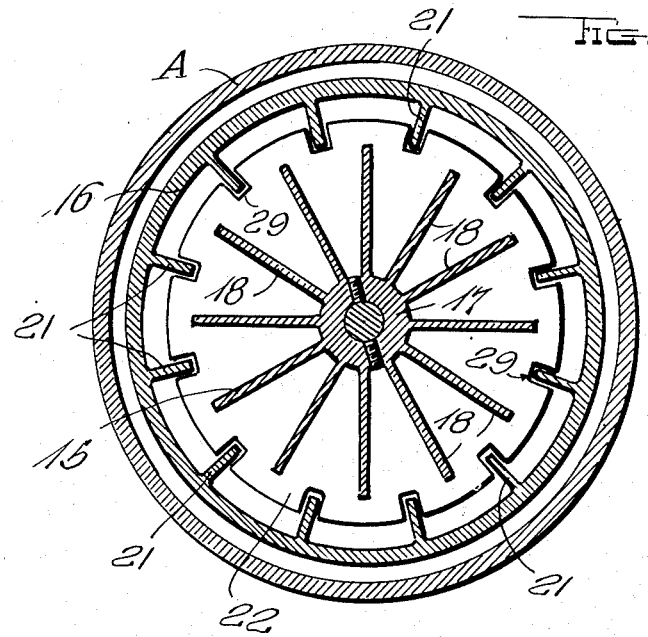
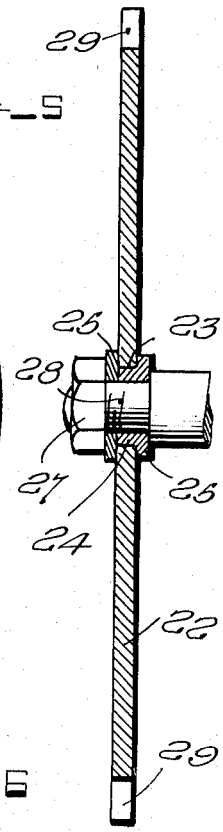
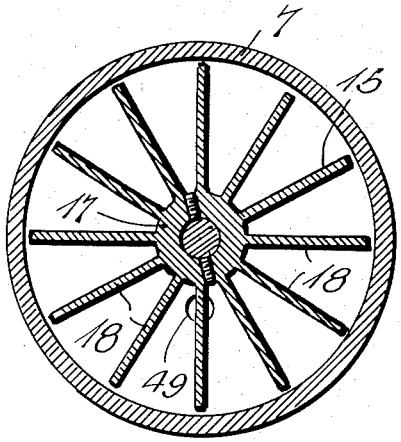
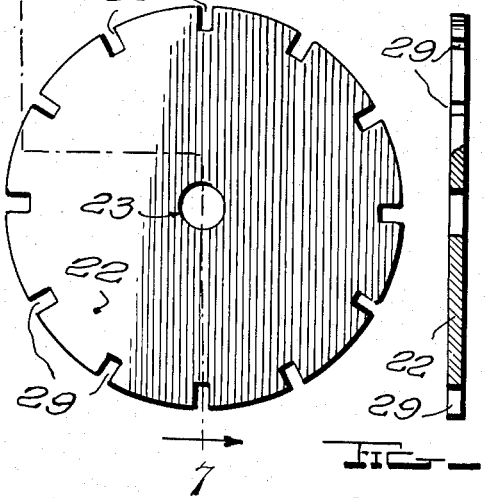

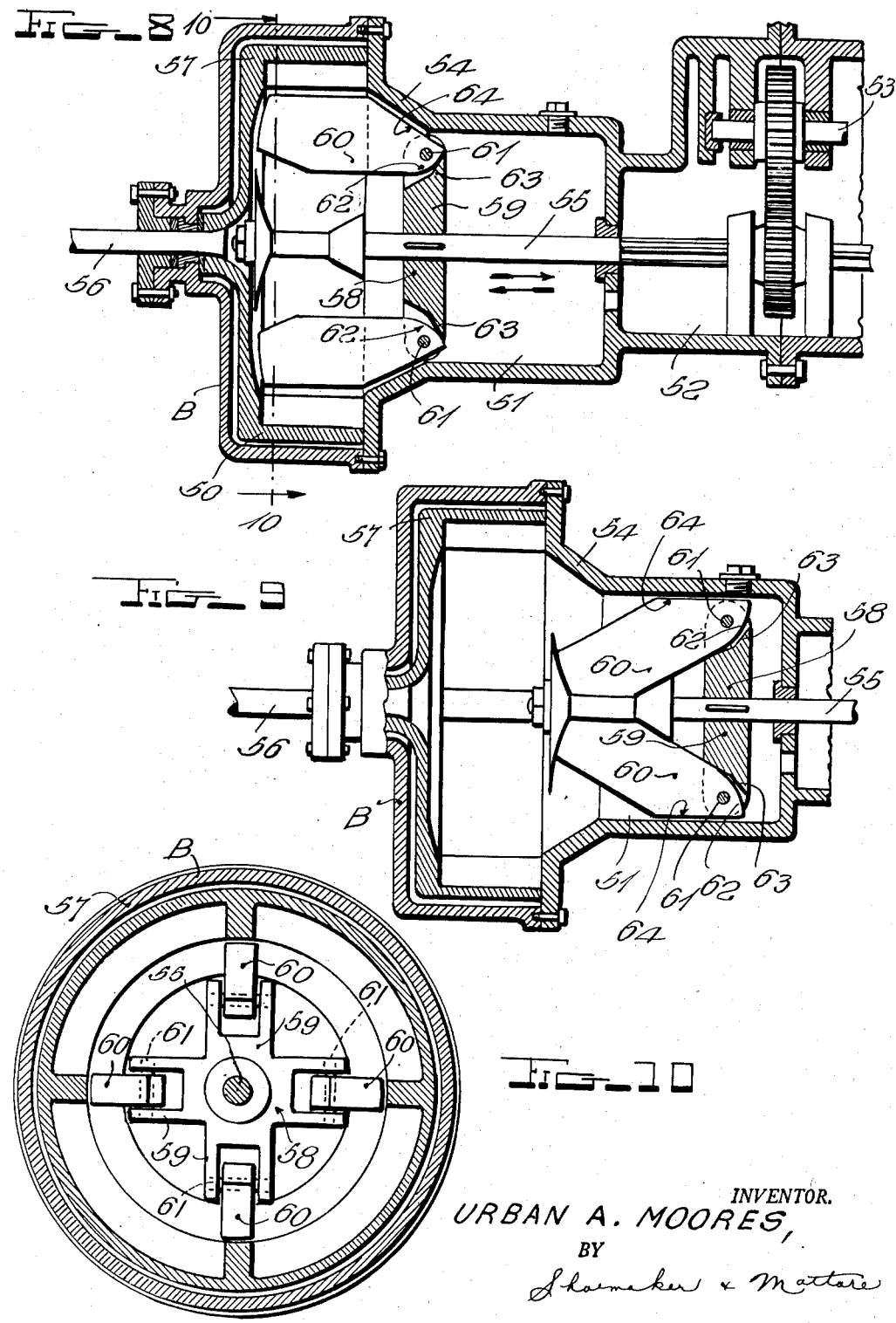

2,569,864

UNITED STATES PATENT OFFICE 2,569,864

VARIABLE-SPEED CLUTCH

Urban A. Moores, Mechanic Falls, Maine

Application December 8, 1947, Serial No. 790,324

2 Claims. (Cl. 192—58)

This invention relates to improvements in variable speed clutches for power transmission from one shaft to another.

An object of the invention is to provide an improved clutch in which motion from one shaft to another is effected through the medium of a liquid, and that will be simple in construction, efficient in operation and will provide for a wide range of speeds.

Another object of the invention is to provide an improved hydraulic clutch employing a turbine wheel and an impeller wheel shiftable longitudinally relatively to the turbine wheel to increase or decrease the power transmitting effect on the turbine wheel, and to provide means for closing off the impeller wheel from the turbine wheel so that the impeller wheel can be allowed to rotate without transmitting power to the turbine wheel.

Still another object of the invention is to provide means of simple, efficient, compact construction for shifting the impeller wheel relatively to the turbine wheel in combination with gearing connecting a shaft of the impeller wheel with the shaft of a motor.

The invention, with other objects, novel features and advantages thereof, and the particular construction, combination and arrangement of parts comprising the same will be understood from the hereinafter contained detail description when considered in connection with the accompanying drawings forming part hereof and illustrating a preferred embodiment of the invention and a modified construction.

In the drawings:

Fig. 1 is a longitudinal section of a variable speed clutch constructed in accordance with the present invention, the impeller wheel being shown in position for maximum transmission of motion to the turbine wheel;

Fig. 2 is a view similar to Fig. 1 but showing the clutch disengaged, the impeller wheel being shifted outside of the turbine wheel and closed off therefrom;

Fig. 3 is a transverse section on the line 3—3 of Fig. 1;

Fig. 4 is a transverse section on the line 4—4 of Fig. 2;

Fig. 5 is a detail view, on an enlarged scale, showing the baffle plate in transverse section mounted on the impeller shaft;

Figs. 6 and 7 are respectively a detail side elevation and a transverse section of the baffle plate;

Fig. 8 is a fragmentary longitudinal section of a modified construction, the impeller wheel being shown in position for maximum transmission of power to the turbine wheel;

Fig. 9 is a view similar to Fig. 8 but showing the clutch disengaged, the impeller wheel being shifted outside of the turbine wheel;

Fig. 10 is a transverse section on the line 10—10 of Fig. 8.

While a preferred embodiment of the invention and a modified construction are illustrated in the drawings, it will be understood that minor changes and modifications may be made in the particular constructions shown, and the invention may be embodied in other forms as will appeal to those skilled in the art and falling within the scope of the appended claims without departing from the spirit of the invention.

Referring to a detailed description of the particular embodiment of the invention illustrated in Figs. 1 to 7 of the drawings, A designates a housing made in two sections 1 and 2 detachably connected together by bolts 3 passing through marginal flanges 4 thereof. Within the housing A is a vertical wall 5 that divides the same into a main cylindrical clutch chamber 6 with an adjoining auxiliary cylindrical chamber 7 at one side thereof, and a chamber 8. 9 designates the primary shaft of the clutch and 10 is the secondary shaft, said shafts extending into the housing A from opposite ends thereof in end-to-end axial relation. The primary shaft 9 is supported for rotation in a bearing 11 on one end of the housing A and in a bearing 12 on the partition wall 5, this shaft extending through the partition wall to the main clutch chamber 6. The secondary shaft 10 is supported for rotation in a bearing 13. Suitable stuffing boxes 14 are provided at the ends of the bearings 11 and 13 to prevent the escape of fluid from the housing.

Arranged for rotation within the clutch chamber 6 is an impeller wheel 15 and a turbine wheel 16. The impeller wheel 15 comprises a hub 17 and radial fins or blades 18, the hub being fixed on the primary shaft 9 at the inner end thereof. The turbine wheel comprises a hub 19 fixed on the inner end of the secondary shaft 10, a disc 20 integral with the hub 19, and a plurality of fins or blades 21 carried by and extending laterally from the outer part of the disc 20 toward the impeller wheel 15, the turbine wheel being open at its central part inwardly of its fins or blades 21 to permit the impeller wheel 15 to be positioned within the same as shown in Fig. 1 of the drawings. As will be understood, with the impeller wheel in this position, upon rotation of the primary shaft 9, the impeller wheel 15 will be rotated and the rotating action of its fins or blades 18 will be transmitted to the fins or blades 21 of the turbine wheel 16 through the medium of the liquid, causing them to rotate at approximately the same speed as the fins or blades 18 of the impeller wheel 15. The primary shaft 9 is movable longitudinally so that the impeller wheel 15 can be shifted longitudinally relatively to the turbine wheel to position the same fully inside the turbine wheel 16 or to an intermediate position to reduce the axial extent of the turbine fins 21 directly exposed to the action of the impeller wheel to reduce the clutching action, or to a position completely outside of the turbine wheel as illustrated in Fig. 2 of the drawings.

In accordance with the present invention, provision is made for completely sealing off the impeller wheel 15 from the turbine wheel 16 when the impeller wheel is shifted outside of the turbine wheel to disengage the clutch so that the impeller wheel can be allowed to rotate without transmitting motion to the turbine wheel. For this purpose, the smaller auxiliary chamber 7 is provided to receive therein the impeller wheel when the same is shifted wholly outside of the turbine wheel 16, and a baffle plate 22 is provided on the inner end of the primary shaft 9 alongside the impeller wheel 15 that is adapted to fit against the wall of the housing A adjoining the open end of the chamber 7 and close the chamber when the impeller wheel is shifted outside of the turbine wheel. The baffle plate 22 is mounted on the primary shaft 9 for movement longitudinally therewith but to permit rotary movement of the shaft 9 relatively thereto, said baffle plate, which is shown circular in form, being provided with a central annular bearing 23 to rotatably fit on a hub 24 between flanges 25 thereof. The hub 24 with the baffle plate 22 thereon is secured on the primary shaft 9 against a shoulder 26 on the shaft by a nut 27 engaging a threaded portion 28 on the end of the shaft. The baffle plate 22, which as shown is of greater diameter than the diameter of the chamber 7, is provided at intervals about its periphery with slots 29 to accommodate inner portions of the fins 21 of the turbine wheel 16. A means for shifting the primary shaft 9 and the impeller wheel 15 is shown as comprising a hand operated lever 30 that is pivoted at its lower end at 31 to an arm 32 extending horizontally from a bracket 33 on one end of the housing A. The lever has intermediate its ends a laterally projecting arm 34 with a part 35 extending downwardly from its outer end parallel with the lever 30 and which is bifurcated or fork shaped to straddle the outer end of the shaft 9. Fixed on the outer end of the shaft 9 between the fork shaped part 35 and the lever 30 is a collar 36 to cooperate therewith in providing a pivotal vertically sliding connection between the lever 30 and the end of the shaft 9. On the arm 32 is a notched segment 37 and slidably mounted on the lever 30 is a spring pressed latch 38 adapted to cooperate with the notches of the segment 37 to hold the impeller 15 in its different positions of adjustment.

The primary shaft 9 is driven from the drive shaft 39 of an internal combustion engine or other motor, the shaft 39, which extends into the upper part of the chamber 8 of the housing A parallel with the primary shaft 9 of the clutch being supported for rotation in a bearing 40 on a part 41 extending inwardly from the wall of the housing A, and a bearing 42 on one end of the housing. A stuffing box 43 is provided at the outer end of the bearing 42. Motion is imparted to the primary shaft 9 of the clutch from the motor shaft 39 through a pinion 44 fixed on the inner end of the shaft 39 meshing with a pinion 45 on the shaft 9. The pinion 45 is supported for rotation and held against movement longitudinally in bearings 46 and 47 on the housing A, said pinion being connected to the primary shaft 9 of the clutch by splines 48 on the shaft 9, so that said shaft is coupled to the pinion 45 for rotation therewith and is shiftable longitudinally relatively thereto.

As will be understood, the main chamber 6 and adjoining auxiliary chamber 7 are filled with a fluid such as oil. The chamber 8 in which the gears 43 and 45 are located is also filled with oil for lubricating purposes. The partition wall 5 is provided with a small opening 49 in the lower part thereof forming a communicating passage between the chambers 7 and 8 so that when the impeller wheel 15 is shifted into the chamber 7, some of the fluid from said chamber may enter the chamber 8, and when the impeller wheel is moved out of the chamber 7 some liquid from the chamber 8 may flow back into the chamber 7. The invention also contemplates employing two liquids of different specific gravity in the main clutch chamber 6 and auxiliary chamber 7 as the liquid medium for transmitting power from the impeller wheel to the turbine wheel, for example, oil and mercury. Enough mercury is used to cover the fins of the turbine wheel 16 with some to spare when the impeller wheel 15 is rotated within the turbine wheel 16. Under these conditions, the mercury would be forced outwardly to the periphery of the clutch and the lighter oil would stay in the central part thereof and act as a lubricant for the shaft bearings, a more efficient clutch action being obtained through the use of the heavier mercury while at the same time provision being made for inexpensive and efficient lubrication of the shaft bearings adjoining the clutch chamber 6. When oil and mercury are employed in the chambers 6 and 7, the port 49 in the partition wall 5 may be omitted, only oil being put in the chamber 8 in which the gearing for the power connection to the primary shaft are located for the purpose of lubrication.

Referring now to the modified form of clutch illustrated in Figs. 8, 9 and 10 of the drawings, in this modified construction, the impeller wheel instead of having its fins or blades rigid with the hub, the fins are pivotally connected at one end to arms on the hub to swing outwardly therefrom when the impeller wheel is being rotated, and means is provided for camming the fins or blades inwardly when the impeller wheel is shifted away from the turbine wheel to enter the smaller auxiliary clutch chamber. In these views, B designates the housing and 50 designates the main clutch chamber. The housing B, in this instance, is provided with a part 54 that is of truncated-cone shape, the wall thereof sloping downwardly from the inner end of the main clutch chamber 50 to the outer end of a cylindrical part 51, the latter with said part 54 forming an auxiliary chamber, in which the impeller wheel is received when the same is shifted wholly outside of the turbine wheel. 55 and 56 designate respectively the primary shaft and the secondary shaft of the clutch, the turbine wheel being designated 57. The impeller wheel comprises a hub 58 with radially extending arms 59 thereon, and radially extending fins or blades 60 each pivotally connected at one end at 61 to one of the arms 59 of the hub 58 at the outer end thereof.

Each of the fins or blades 60 at its pivoted end is provided with an edge portion 62 to co-act with a portion 63 on one of the arms 59 to limit the extent of its outward movement. Each of the fins or blades 60 is also provided with an inclined edge portion 64 to cooperate with the truncated-cone shaped part 54 of the housing B. When the impeller wheel is shifted longitudinally outside of the turbine wheel 57, the inclined edge portion 64 of the fins or blades 60 of the impeller wheel are cammed inwardly by the wall of the truncated-cone shaped part 54 to a position to readily enter the same and the cylindrical part 51 as illustrated in Fig. 2 of the drawings. As will be understood, when the impeller wheel is positioned within the auxiliary chamber 51, the same will be closed off at its periphery from transmitting power to the turbine wheel 57. While in this modified construction, the impeller wheel is not completely sealed off from the turbine wheel as in the construction hereinbefore described and illustrated in Figs. 1 to 7, it has important advantages in certain types of work where the starting torque is heavy and the load is continuous and heavy. Under these conditions, exposure of the impeller wheel at its outer end would not result in the transmission of sufficient torque to the turbine wheel 57 to start the load on the secondary shaft of the clutch and keep it moving. The gear drive connection between the primary clutch shaft 55 and the power or motor shaft 53, and also the means for shifting the primary shaft 55 longitudinally is the same as that illustrated in Figs. 1 and 2 of the drawings.

What I claim is:

1. A hydraulic clutch including an impeller wheel, a turbine wheel, the impeller wheel being adapted to be positioned within the turbine wheel and to be shifted longitudinally outside of the same, said impeller wheel comprising a central hub part and radial blades pivotally connected at one end to the hub part to swing radially relatively to said hub part, each of said blades having an edge portion extending at an outward inclination from the pivotally connected end of the same with said hub part, a housing around said wheels, said housing having a part at one end thereof of less diameter than the remaining part thereof to receive therein the impeller wheel when the same is shifted outside of the turbine wheel, the inclined edge portions of the blades of the impeller wheel engaging a wall of the housing and being cammed inwardly thereby in position to enter said smaller housing part when the impeller wheel is shifted longitudinally away from the turbine wheel.

2. A hydraulic clutch including an impeller wheel, a turbine wheel, the impeller wheel being adapted to be positioned within the turbine wheel to transmit power thereto and to be shifted longitudinally outside of the same, said impeller wheel comprising a central hub part and radial blades each pivotally connected at one end to the hub part to swing radially relatively thereto, a housing around said wheels, said housing having a part at one end thereof of less diameter than the remaining part thereof to receive therein the impeller wheel when the same is shifted outside of the turbine wheel, said housing also having a part adjoining said smaller end part of truncated-cone shape adapted to be engaged by the blades of the impeller wheel when the impeller wheel is shifted longitudinally away from the turbine wheel, and to cam the blades inwardly in position to enter said smaller housing part.

URBAN A. MOORES.

REFERENCES CITED

The following references are of record in the file of this patent:

UNITED STATES PATENTS

| Number | Name | Date |
|---|---|---|
| 1,009,280 | Citroen | Nov. 21, 1911 |
| 1,173,877 | Severy | Feb. 29, 1916 |
| 1,238,447 | Severy | Aug. 28, 1917 |
| 1,972,741 | Kohl | Sept. 4, 1934 |
| 2,404,419 | Weatherly | July 23, 1946 |

FOREIGN PATENTS

| Number | Country | Date |
|---|---|---|
| 295,373 | Great Britain | June 18, 1928 |
| 318,360 | Italy | June 11, 1934 |